Oct. 27, 1964  J. G. DELPH  3,154,186
ARTICLE CONVEYING AND INVERTING MECHANISM
Filed March 6, 1962  3 Sheets-Sheet 1
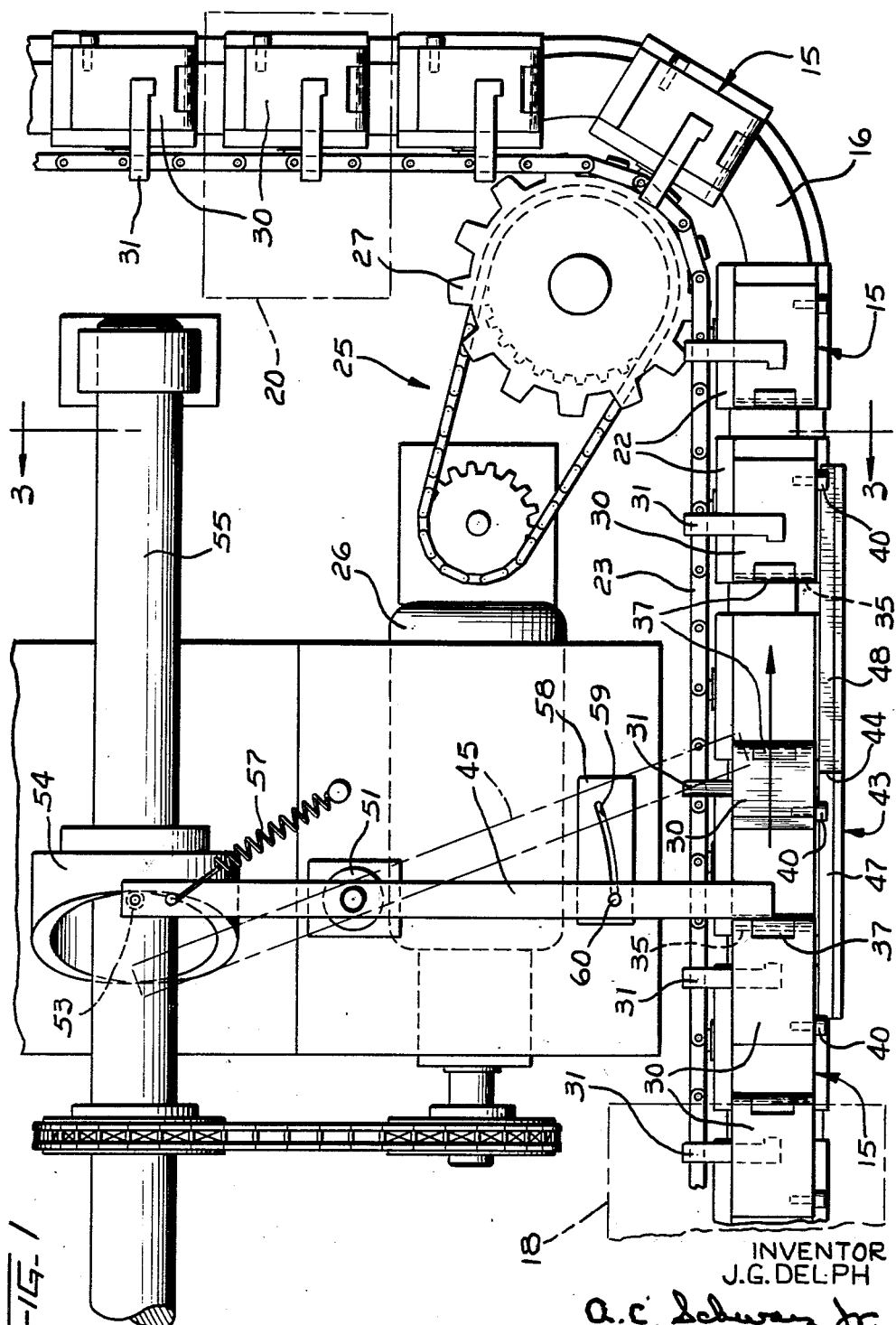
INVENTOR
J. G. DELPH
BY *A. C. Schwarz Jr.*
ATTORNEY

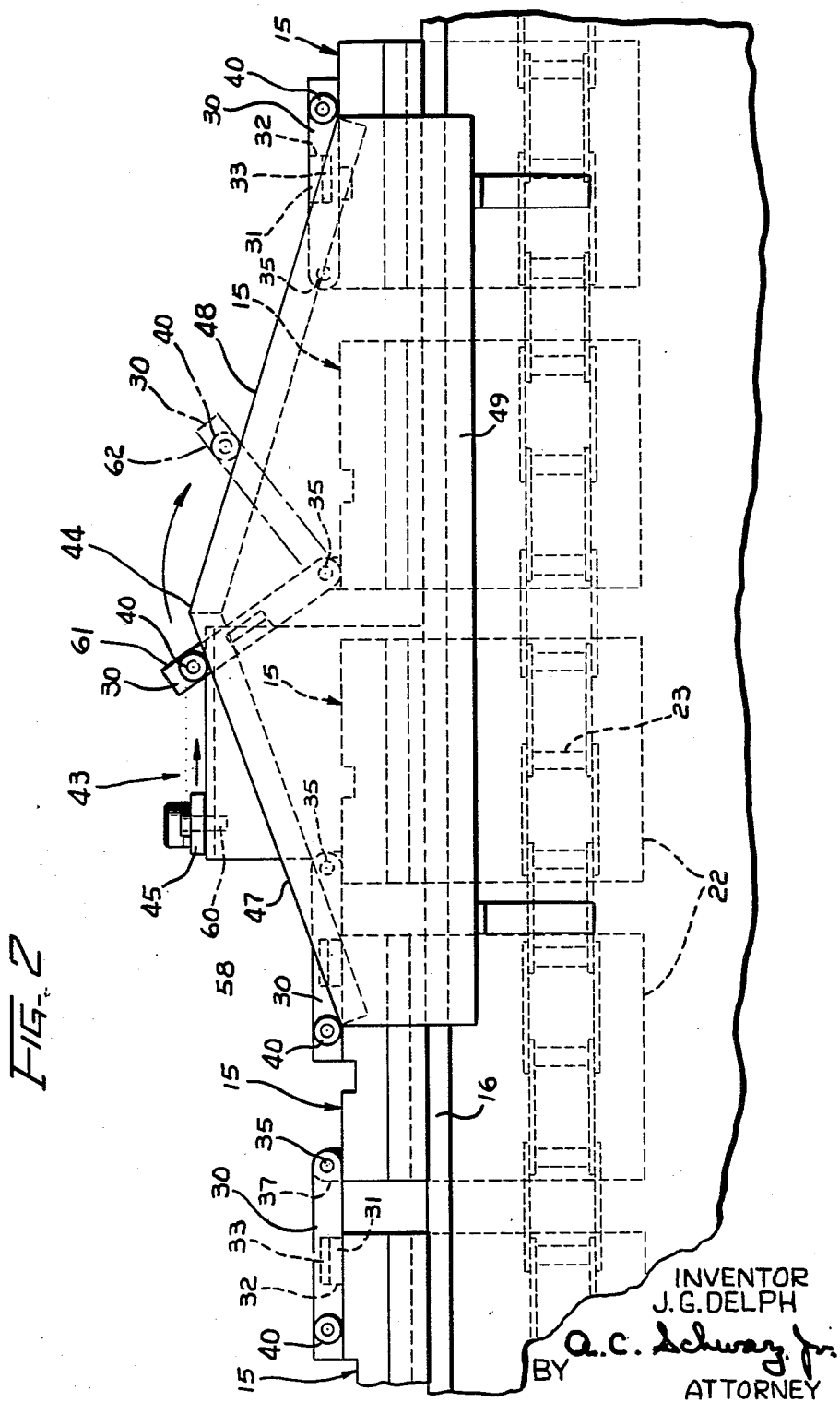

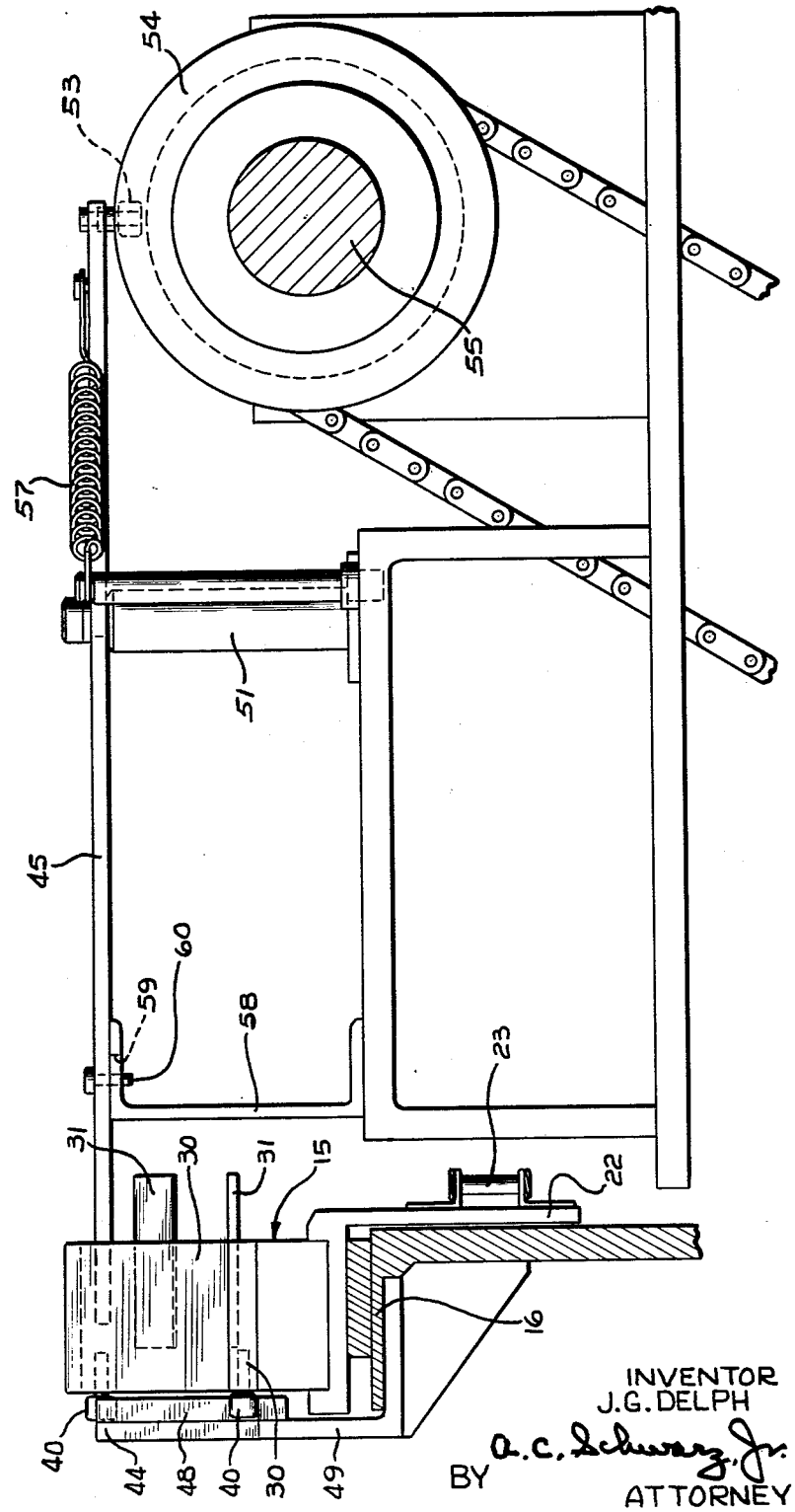

United States Patent Office 3,154,186
Patented Oct. 27, 1964

3,154,186
ARTICLE CONVEYING AND INVERTING
MECHANISM
Joseph G. Delph, Indianapolis, Ind., assignor to Western
Electric Company, Incorporated, New York, N.Y., a
corporation of New York
Filed Mar. 6, 1962, Ser. No. 177,849
6 Claims. (Cl. 198—29)

This invention relates to article conveying and inverting mechanism, and more particularly to a mechanism for conveying articles to work stations and for turning the articles over between stations.

In the fabrication of certain articles, it is necessary to perform some work operations thereon with the articles supported in an upright position and to invert the article to perform other work operations thereon. In the performance of the several work operations on the article in an automatic machine having a plurality of work stations and a conveyor for advancing the articles to the work stations, it is necessary therefore to provide mechanism for turning the articles from a normal upright position to an inverted position between certain work stations during the indexing movement of the conveyor and for returning the articles from inverted position to upright position between other stations.

An object of the invention is to provide an improved mechanism for conveying and inverting articles.

Another object of the invention is to provide mechanism for conveying articles to work stations and for turning the articles from inverted to normal upright positions between stations.

A mechanism illustrating certain aspects of the invention may include a carrier mounted for movement along a horizontal path to successive work stations and having an article holder mounted thereon for movement therewith and for pivotal movement relative thereto about a horizontal axis to a horizontal upright first position and a horizontal inverted second position for supporting the article in upright and in inverted positions. A cam follower projecting laterally from the holder is adapted to engage an upwardly sloping cam track fixedly mounted in its path between a pair of the work stations and the cam follower is moved upwardly thereby during the indexing movement of the carrier between stations to effect the progressive turning of the holder from the horizontal section position toward a vertical position. A kick-over lever is supported with one end thereof above the path of movement of the holder, and as the holder approaches a vertical position, the lever is actuated to kick the holder over the center and beyond the vertical position into engagement with a second cam track that serves to lower the holder to the horizontal upright position on the carrier.

Other objects, advantages and novel aspects of the invention will become apparent upon consideration of the following detailed description, in conjunction with the accompanying drawings, in which:

FIG. 1 is a fragmentary plan view of an article fabricating machine showing the article conveying and inverting mechanism;

FIG. 2 is an enlarged fragmentary front view of the mechanism; and

FIG. 3 is an enlarged fragmentary cross sectional view of the mechanism taken on the line 3—3 of FIG. 1.

Referring to the drawings, the article conveying and inverting mechanism of the machine comprises a plurality of carriers 15 which are supported on a track 16 for horizontal movement in one direction along a predetermined path through a plurality of work stations, two of which are indicated by dotted lines at 18 and 20 in FIG. 1. The carriers 15 have depending brackets 22 (FIG. 3) that are connected to an endless chain 23 which serves to interconnect the carriers 15 and cooperate therewith to form an endless conveyor, only a portion of which is indicated in FIG. 1. Indexing movement is imparted to the carriers 15 by an intermittent drive 25 including a motor 26 and a chain driven sprocket 27 meshing with the chain 23 (FIG. 1).

Each of the carriers 15 is provided with a holder 30 for supporting an article 31 thereon with a portion of the article extending laterally from the holder in accessible position for successive work operations thereon in the several work stations. The article 31 is positioned in a recess 32 in the holder and is releasably retained therein by a magnet 33 fixed to the holder. In the present instance, the holder 30 is in the form of a flat plate that is pivotally connected to a pin 35 which is supported on an upstanding lug 37 on the carrier 15 adjacent to one end thereof. As viewed in FIGS. 1 and 3, the holder is coextensive in width with the carrier 15 and has a cam follower 40 extending from one side edge thereof in spaced relation to the pivot pin 35 and adjacent to the opposite end of the holder.

The arrangement of the holder 30 and the carrier 15 is such that the holder is supported on the upper surface of the carrier in a horizontal upright position permitting the loading of the article 31 onto the holder and the performance of one type work operation thereon in one station; and the holder is adapted to be turned through 180° and supported on the carrier in a horizontal inverted second position for the performance of another type of work operation on the article. The carriers 15 are positioned relative to each other so that when a holder 30 is turned to its inverted position, it rests partly on the adjacent carrier.

Intermediate the work stations 18 and 20 a turnover mechanism 43 is provided for returning the holders 30 to their upright first position from their inverted second position to which they had previously been turned by mechanism (not shown) at another point in the path of movement of the carrier. The turnover mechanism comprises a stationary cam 44 mounted in the path of movement of the cam follower 40 for raising the holder 30 from a horizontal position toward a vertical position, and a kickover lever 45 for kicking the holder 30 overcenter and past the vertical position so that the holder will be urged by gravity to its first position on the carrier 15.

The cam 44 has an upwardly sloping cam track 47 for raising the follower 40 and progressively turning the holder 30 upwardly about the pivot pin 35 from the horizontal inverted second position toward a vertical position, and a downwardly sloping cam track 48 for lowering the cam follower 40 and the holder 30 from an oblique to its horizontal upright first position after it has been pushed over center and beyond the vertical position. As shown in FIG. 3, the cam 44 is secured to a bracket 49 which is fixedly supported on the track 16.

The kickover lever 45 is pivotally supported intermediate its ends on a stationary post 51 for horizontal movement. The post 51 is mounted on a suitable frame member 52. A cam follower 53 is secured to one end of the lever 45 and rides on a cam 54 that is fixed to a shaft 55 and is driven in timed relation to the movement of the carriers 15. A spring 57 stresses the lever 45 for movement to a normal position (FIGS. 1 and 3) with the free end of the lever 45 positioned adjacent to the cam track 47 and above the path of travel of the holder 30 as the holder is being turned by the cam track 47 from a horizontal position toward a vertical position. To support the free end portion of the lever 45 and limit its horizontal movement a bracket 58 is provided which is supported on the frame member 52 and has a slot 59 therein cooperable with a pin 60 on the lever.

In the operation of the turnover mechanism, as the carriers 15 are indexed and advance step by step from station 18 to station 20, the cam track 47 engages the cam follower 40 of a holder 30 and progressively raises the follower as it rides upwardly on the cam track toward the upper end thereof. This causes the holder 30 to be progressively turned in a clockwise direction (FIG. 2) about the pivot pin 35 from its horizontal inverted second position toward a vertical position. At the end of an indexing movement the holder 30 reaches an oblique position indicated at 61 in FIG. 2 with the upper end of the holder 30 located in the path of horizontal movement of the free end of the lever 45. The movement of the lever 45 is timed to engage the holder 30 at this time and push the holder over center from one side of the pivot pin whereby the holder 30 is urged downwardly by gravity to an oblique position indicated at 62 with the follower 40 in engagement with the cam track 48. During the next indexing movement of the carrier 15 and the holder 30, the holder is progressively lowered to its horizontal upright first position in engagement with the carrier 15.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Article conveying and inverting mechanism comprising a carrier, means to advance said carrier, an article holder pivotally mounted on said carrier for pivotal movement from a first upright position to a second inverted position, means mounted in the path of movement of said holder for partially pivoting said holder from first to second position, and movable means engageable with said holder for completing pivoting of said holder from first to second position.

2. Article conveying and inverting mechanism comprising a carrier movable in one direction along a horizontal path, an article holder pivotally mounted on said carrier for movement therewith and for pivotal movement relative thereto about a horizontal axis to a horizontal upright position and to a horizontal inverted position, means mounted in the path of movement of said holder for engaging and positively turning said holder upwardly about said axis from one horizontal position toward a vertical position, and means engageable with said holder as it approaches but has not reached the vertical position for pushing said holder past the vertical position.

3. Mechanism as defined in claim 2 and including means mounted in the path of said holder for engaging said holder as it is pushed beyond the vertical position by said pushing means and for lowering said holder to said other horizontal position.

4. Mechanism of the type described comprising a carrier, means for supporting the carrier for movement along a substantially horizontal path, drive means for advancing said carrier in one direction along said path, an article holder pivotally mounted on said carrier for movement therewith and for turning movement about a horizontal axis and supported by said carrier in an upright first position and an inverted second position, a cam follower on said holder, a fixed cam track for raising said follower to progressively turn said holder from the inverted second position toward a vertical position, a movable member supported above the path of movement of said holder as said holder is being swung upwardly by said cam track, means operable in timed relation to the movement of said carrier for actuating said member to engage said holder as it approaches a vertical position and to push said holder in the same direction beyond the vertical position so that the holder will be urged by gravity to the first horizontal position.

5. Mechanism as defined in claim 4 and including a second cam track for supporting said cam follower when said holder has been pushed beyond said vertical position and for progressively lowering said holder to said upright first position on said carrier.

6. Article conveying and inverting mechanism comprising a carrier, means for advancing said carrier in one direction along a horizontal path, an article holder, means for pivotally mounting said holder on said carrier for movement therewith and for turning movement relative thereto about a horizontal axis to an upright first position and an inverted second position, a cam follower extending laterally from said holder in spaced relation to said pivotal axis and following said axis when said holder is in said inverted second position, an upwardly sloping cam track fixedly mounted in the path of movement of said follower for raising said follower and turning said holder from said inverted second position toward a vertical position, a member movably mounted adjacent to said cam track and above the path of movement of said holder as the holder is being turned by said upwardly sloping cam track, means operable in timed relation to the movement of said carrier for actuating said member horizontally to engage said holder as it approaches a vertical position and to push said holder beyond said vertical position so that said holder will be urged by gravity to the first position on the carrier, and a downwardly sloping cam track for engaging said follower after it has been pushed beyond the vertical position to progressively lower said holder to its upright first position.

References Cited in the file of this patent

UNITED STATES PATENTS

| | | |
|---|---|---|
| 1,335,136 | Stuart | Mar. 30, 1920 |
| 1,474,619 | Buck | Nov. 20, 1923 |
| 1,830,359 | Hamel | Nov. 3, 1931 |